(12) United States Patent
Batson et al.

(10) Patent No.: US 7,543,115 B1
(45) Date of Patent: *Jun. 2, 2009

(54) TWO-HOP SOURCE SNOOP BASED CACHE COHERENCE PROTOCOL

(75) Inventors: Brannon Batson, Brooklyn, NY (US); Benjamin Tsien, Fremont, CA (US); William A. Welch, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/332,057

(22) Filed: Jan. 13, 2006
(Under 37 CFR 1.47)

Related U.S. Application Data

(63) Continuation of application No. 11/330,977, filed on Jan. 11, 2006, now abandoned.

(51) Int. Cl.
*G06F 12/00* (2006.01)
(52) U.S. Cl. ................ 711/141; 711/140; 711/145; 711/146
(58) Field of Classification Search ........... None
See application file for complete search history.

(56) References Cited

U.S. PATENT DOCUMENTS

| 6,009,488 | A | 12/1999 | Kavipurapu | 710/105 |
| 6,018,791 | A * | 1/2000 | Arimilli et al. | 711/141 |
| 6,922,756 | B2 | 7/2005 | Hum et al. | |
| 6,950,438 | B1 * | 9/2005 | Owen et al. | 370/409 |
| 2005/0160132 | A1 * | 7/2005 | Van Doren et al. | 709/200 |
| 2005/0160237 | A1 * | 7/2005 | Tierney et al. | 711/145 |
| 2005/0262250 | A1 | 11/2005 | Batson et al. | |

OTHER PUBLICATIONS

U.S. Appl. No. 10/833,963, filed Apr. 27, 2004 entitled "A Two-Hop Cache Coherency Protocol".

* cited by examiner

*Primary Examiner*—Hyung S Sough
*Assistant Examiner*—Kaushikkumar Patel
(74) *Attorney, Agent, or Firm*—Trop, Pruner & Hu, P.C.

(57) ABSTRACT

A method for cache coherency in a network of a plurality of caching agents includes storing a plurality of miss requests, transmitting the miss requests into the network, sending a probe message on a probe channel and a request message on a second channel from one of the plurality of caching agents, and maintaining an open status for the miss request until the requesting cache agent receives the data or an ownership indicator.

13 Claims, 6 Drawing Sheets

TWO-HOP SOURCE SNOOP BASED CACHE COHERENCE PROTOCOL

RELATED APPLICATIONS

This application is a continuation of U.S. patent application Ser. No. 11/330,977 filed Jan. 11, 2006 entitled "A TWO-HOP SOURCE SNOOP BASED CACHE COHERENCE PROTOCOL" and is related to or utilizes embodiments from the following U.S. patent applications:

(1) Application Ser. No. 11/332,028, filed on Jan. 13, 2006 and entitled A TWO-HOP SOURCE SNOOP BASED MESSAGING PROTOCOL which claims priority to application Ser. No. 11/331,301, filed concurrently with this application and entitled "A TWO-HOP SOURCE SNOOP BASED MESSAGING PROTOCOL";

(2) Application Ser. No. 10/833,963, filed on Apr. 27, 2004 and entitled "A TWO-HOP CACHE COHERENCY PROTOCOL";

(3) application Ser. No. 10/833,965, filed on Apr. 27, 2004 and entitled "A MESSAGING PROTOCOL"; and (4) U.S. Pat. No. 6,922,756 entitled "FORWARD STATE FOR USE IN CACHE COHERENCY IN A MULTI-NODE SYSTEM".

FIELD OF THE INVENTION

The invention relates to high speed point to point interconnect links. More particularly, the invention relates to how a cache coherence protocol may be applied for implementing a coherent memory system with an interconnect architecture utilizing point-to-point links. For example, the described cache coherence protocol facilitates and supports systems ranging from a single-socket up through and greater than sixty four socket segments.

BACKGROUND OF THE INVENTION

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

A messaging protocol defines a set of allowed messages between agents, such as, caching and home agents. Likewise, the messaging protocol allows for a permissive set of valid message interleavings. However, the messaging protocol is not equivalent to a cache coherence protocol. In contrast, the messaging protocol serves the purpose of establishing the "words and grammar of the language". Consequently, the messaging protocol defines the set of messages that caching agents must send and receive during various phases of a transaction. In contrast to a messaging protocol, an algorithm (cache coherence protocol) is applied to a home agent for coordinating and organizing the requests, resolving conflicts, and interacting with caching agents.

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for a cache coherence protocol are described. For example, in one embodiment, this cache coherence protocol is one example of a two-hop protocol that utilizes a messaging protocol from referenced application Ser. No. 11/331,301, that is applied for implementing a coherent memory system using agents in a network fabric. One example of a network fabric may comprise either or all of: a link layer, a protocol layer, a routing layer, a transport layer, and a physical layer. The fabric facilitates transporting messages from one protocol (home or caching agent) to another protocol for a point to point network. In one aspect, FIG. 1 depicts a cache coherence protocol's abstract view of the underlying network.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. In one embodiment, the claimed subject matter utilizes a point-to-point (pTp) architecture that supports a layered protocol scheme, FIG. 1 illustrates one example of a cache coherence protocol's abstract view of the underlying network. In one embodiment, the claimed subject matter may be utilized for an architecture that depicts a plurality of caching agents and home agents coupled to a network fabric (see FIG. 1). For example, the network fabric adheres to a layered protocol scheme and comprised of: a physical layer, a link layer, a routing layer, a transport layer and a protocol layer (as depicted in connection with FIG. 2). The fabric facilitates transporting messages from one protocol (home or caching agent) to another protocol for a point to point network. In one aspect, the figure depicts a cache coherence protocol's abstract view of the underlying network.

Figure 1:
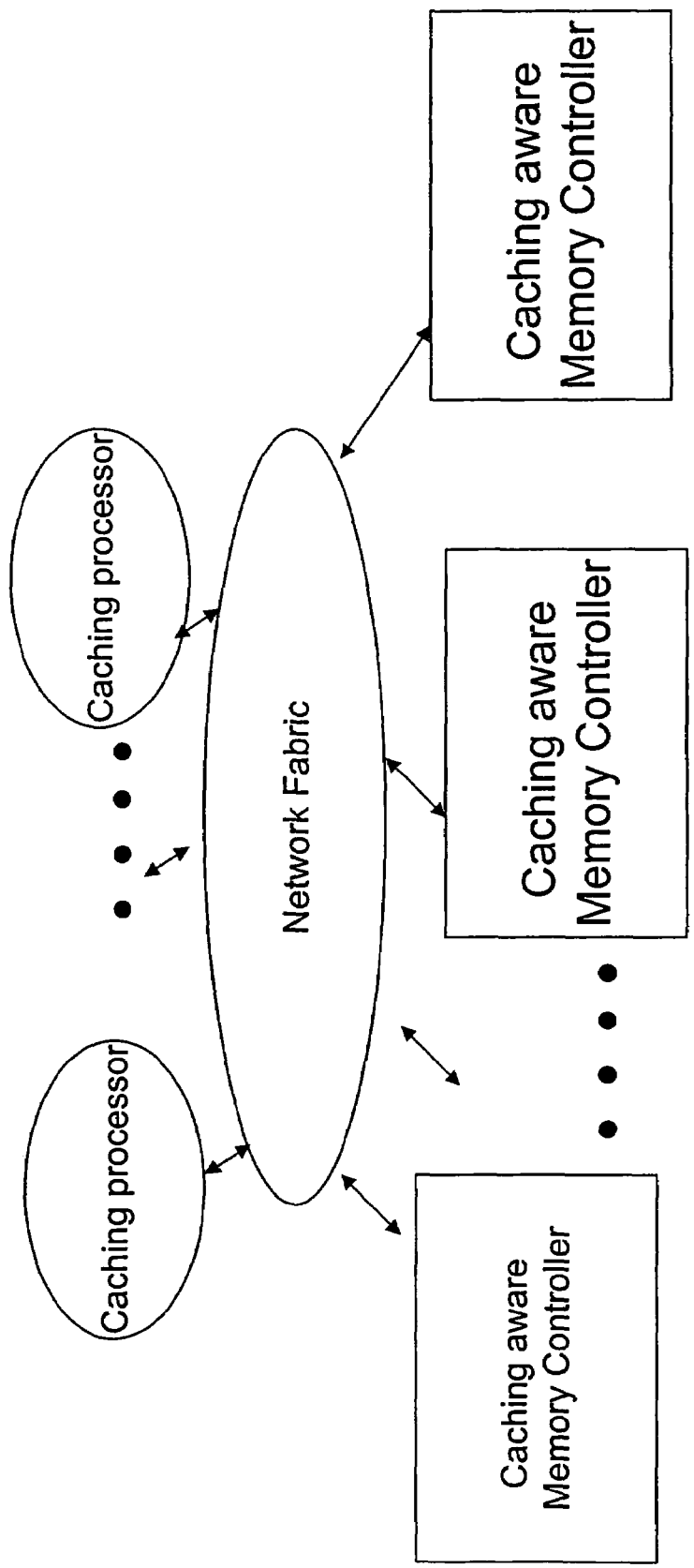
FIG. 1 is a protocol architecture as utilized by one embodiment.

FIG. 1 is a high level, simplified abstraction of a protocol architecture as utilized by one embodiment. The fabric facilitates transporting messages from one caching agent (caching processor, caching aware memory controller, etc.) to another protocol for a point to point network. In one aspect, the figure depicts a cache coherence protocol's abstract view of the underlying network.

As previously noted, the claimed subject matter incorporates several innovative features from the related applications. For example, the claimed subject matter references the Forward state (F-state) from U.S. Pat. No. 6,922,756 and entitled "Forward State for Use in Cache Coherency in a Multi-Node System". Likewise, in one embodiment, the claimed subject matter utilizes conflict tracking at the home agent for various situations, which is discussed in connection with U.S. Patent Application Publication No. 2007/0022252, and entitled "A TWO-HOP CACHE COHERENCY PROTOCOL". However, various features of the related applications are utilized throughout this application and we will discuss them as needed. The preceding examples of references were merely illustrative.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used.

As previously discussed in the messaging protocol of U.S. Patent Application Publication No. 2005/0262250, FIG. 1 of that application depicts a cache coherence protocol's abstract view of the underlying network.

In this embodiment, the caching agent:

1) makes read and write requests into coherent memory space 2) hold cached copies of pieces of the coherent memory space 3) supplies the cached copies to other caching agents.

Also, in this embodiment, the home agent guards a piece of the coherent memory space and performs the following duties:

1) tracking cache state transitions from caching agents 2) managing conflicts amongst caching agents 3) interfacing to a memory, such as, a dynamic random access memory (DRAM)

4) providing data and/or ownership in response to a request (if the caching agent has not responded).

For example, the cache coherence protocol depicts a protocol for the home agent that allows the home agent to sink all control messages without a dependency on the forward progress of any other message.

Figure 2:
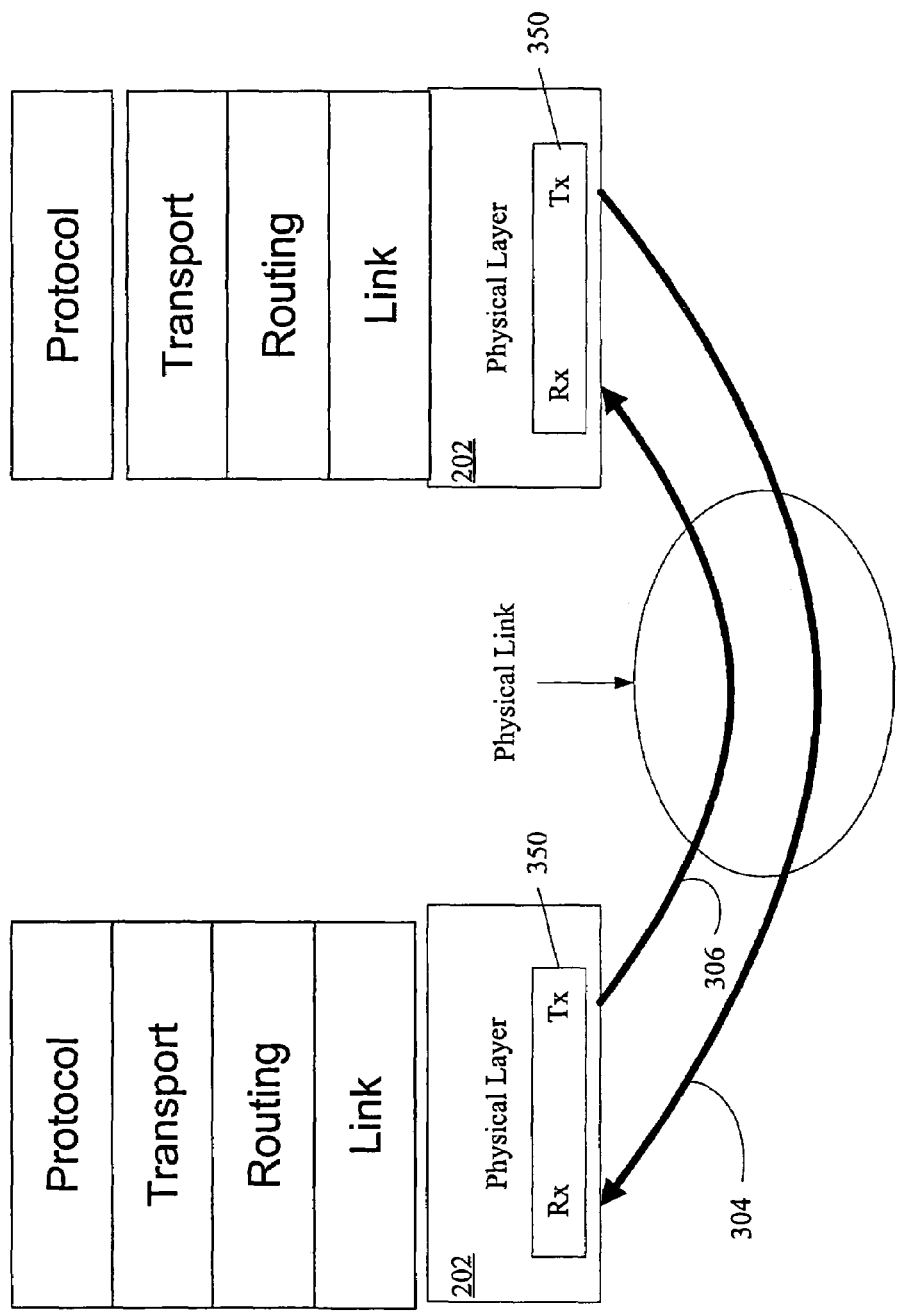
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

Figure 3:
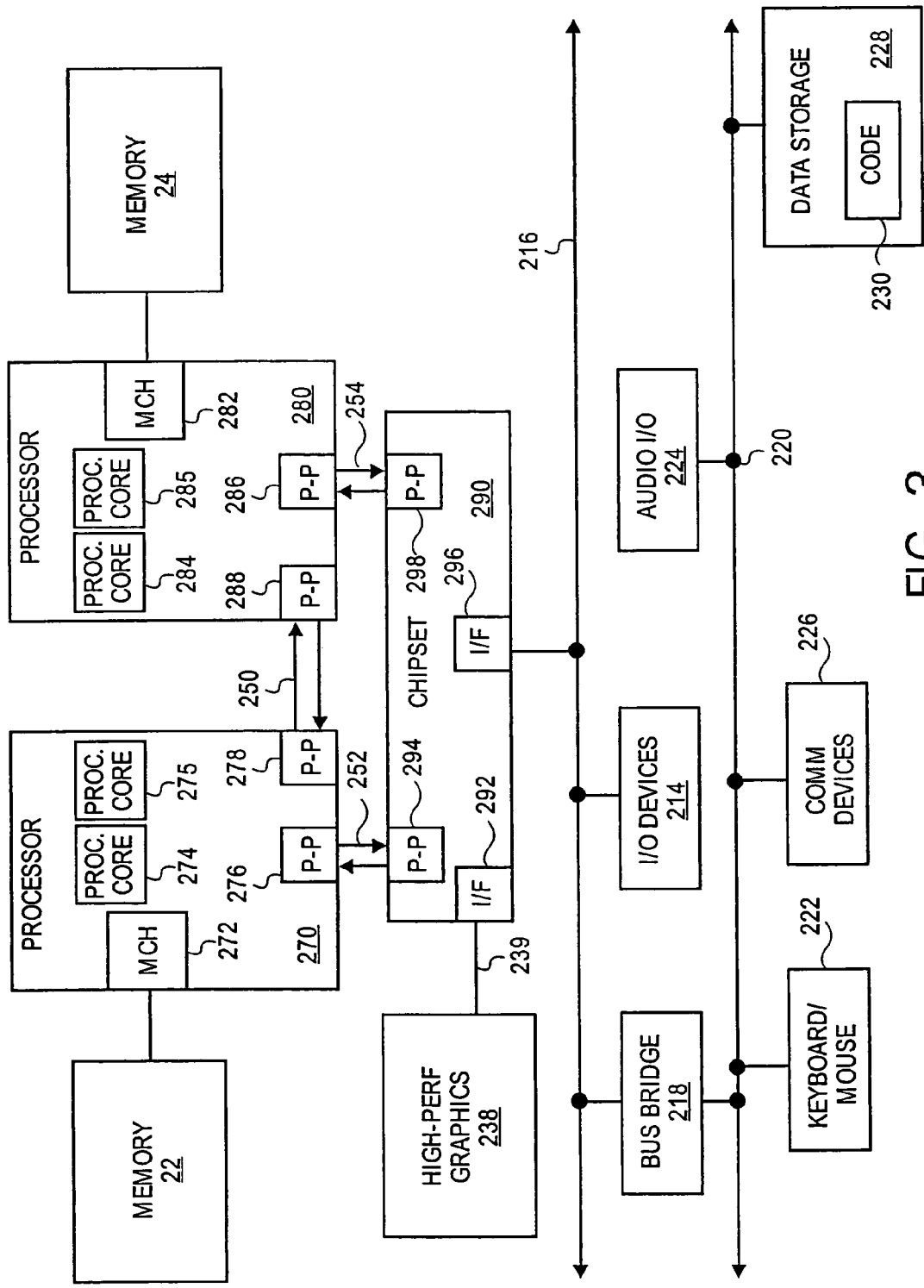
FIG. 3 depicts a system as utilized by one embodiment in accordance with the claimed subject matter.

FIG. 3 is a system as utilized by one embodiment of the claimed subject matter. In particular, FIG. 3 shows a system where processors, memory, and input/output devices are interconnected by a number of point-to-point interfaces.

The system of FIG. 3 may also include several processors, of which only two, processors 270, 280 are shown for clarity. Processors 270, 280 may each include a memory controller or a local memory controller hub (MCH) 272, 282 to connect with memory 22, 24. In one embodiment, the memories 22 and 24 are DRAM and/or a cache memory. In one embodiment, the cache memory could be any level of cache memory used by a processor. In one embodiment, processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. In one embodiment, the processors 270 and 280 would have multiple processor cores. 274, 275 and 284, 285 respectively. However, the claimed subject matter is not limited to each processor having two processor cores. The embodiment of two processor cores is merely one example and one skilled in the art appreciates utilizing a different number of processor cores for each processor based at least in part on the die size requirements, processing specifications, power limitations, etc. . . .

Chipset 290 may also exchange data with a high-performance graphics circuit 238 via a high-performance graphics interface 239.

At least one embodiment of the invention may be located within the PtP interface circuits within each of the PtP bus agents of FIG. 3. Other embodiments of the invention, however, may exist in other circuits, logic units, or devices within the system of FIG. 3. Furthermore, other embodiments of the invention may be distributed throughout several circuits, logic units, or devices illustrated in FIG. 2.

Figure 4:
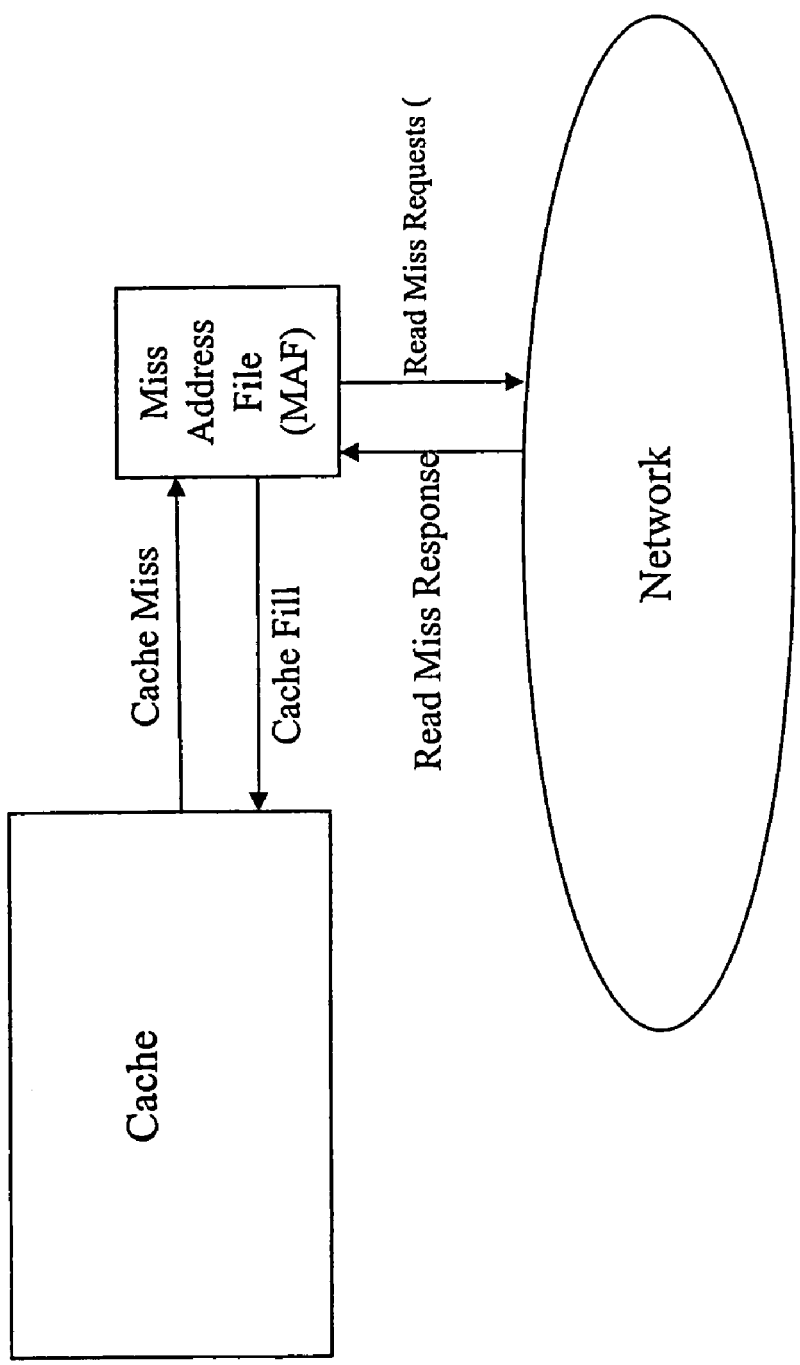
FIG. 4 depicts an apparatus that includes a cache, a table for MAF entries and a network as utilized in one embodiment.

FIG. 4 depicts an apparatus that includes a cache, a table for MAF entries and a network as utilized in one embodiment. In one embodiment, the process of generating a request involves allocating a (Miss Address File) MAF entry, sending a Req2Home message to the home node on the acknowledgment channel, and sending out probe messages to all the peer node caching agents on the probe virtual channel. The transaction ID (TID) of the request (i.e. the MAF id) is sent along with the requesting node ID (NID) in the probe messages and Req2Home message. This NID:TID tag is used in every message related to this request. In this embodiment, the cache coherence protocol expects at most one request per address per requesting NID at a time. Nonetheless, it is possible to have a victim outstanding with a subsequent Request outstanding at the same time).

As previously mentioned, a request involves allocating a MAF entry. In one embodiment, a MAF will hold a plurality of miss requests. Subsequently, the MAF controller individually transmits the miss requests into the network. Eventually, the system network responds to each request with a network packet. Upon receiving the response, the MAF controller returns the cache block associated with the initial miss request to the cache and deallocates the corresponding MAF entry.

Once the probe messages and Req2Home messages have been sent, the source node will receive a block response (Blk*) or a ToDirty response (InvalToDirtyResp, SharedtoDirtyProb). The data or ownership indicator can be relayed to the requesting 'core' as soon as it arrives and the MAF entry must be kept open until the release arrives, At some point after the request and probe messages have been sent, the requestor receives a Rel or RelCnflt message type from the home node. A RelCnflt indicates that the home node has identified a potential true conflictor with this node. A potential true conflictor is also indicated by the requestor receiving a conflicting incoming probe to this line from a different requestor (described in the peer node algorithm). If neither of these conditions is true, the requestor will send a DataAck message to the home, otherwise it must generate a DataAckCnflt* message to the home node.

This DataAck* message will push in any remaining probe responses if any exists in-flight. If the home sees a plain DataAck message and it did not receive a CnfltAck for the request, it will send a plain Rel response to the requester, which causes deallocation of the MAF entry. However, if the home receives a DackAckCnflt* or if a peer reports CnfltAck, it will cause it to pick a conflictor and send a RelFwd* message to the requestor. During the time that the DataAckCnflt* is outstanding (waiting for a Rel or RelFwd*), incoming probes to this line are buffered. If there are no remaining true conflictors when the home node receives the DataAckCnflt*, then the home node will send the requestor a plain Rel message (which causes deallocation of the MAF entry).

If the home node sends a RelFwd*, the requestor should extract the latest copy of the line and forward it along to the indicated conflictor. Therefore, the requestor must be sure to keep a copy of the line around when it sends a DataAckCnflt*, until a final Rel or RelFwd* is received. The RelFwd* may require that an M copy is downgraded to E, F, or I before sending to the conflictor. In this case, the RelFwd* will cause a Victim to be sent to the home node, and a Blk*Vic to be sent to the requestor.

As soon as the final Rel or RelFwd* is received at the requestor, any buffered conflicting probes are released and processed.

Table 1 documents the state transitions for the various RelFwd types (generated by the home node).

TABLE 1

| Probe Types | Cache State | Cache Next State | Send to Req | Send to Home |
|---|---|---|---|---|
| RelFwdF | M | S | BlkForwVic | Victim |
| RelFwdF | EF | S | BlkForw | — |
| RelFwdFI | M | I | BlkForwVic | Victim |
| RelFwdFI | EF | I | BlkForw | — |
| RelFwdE | M | I | BlkMod | — |
| RelFwdI | M | M | BlkInval | — |

Figure 5:
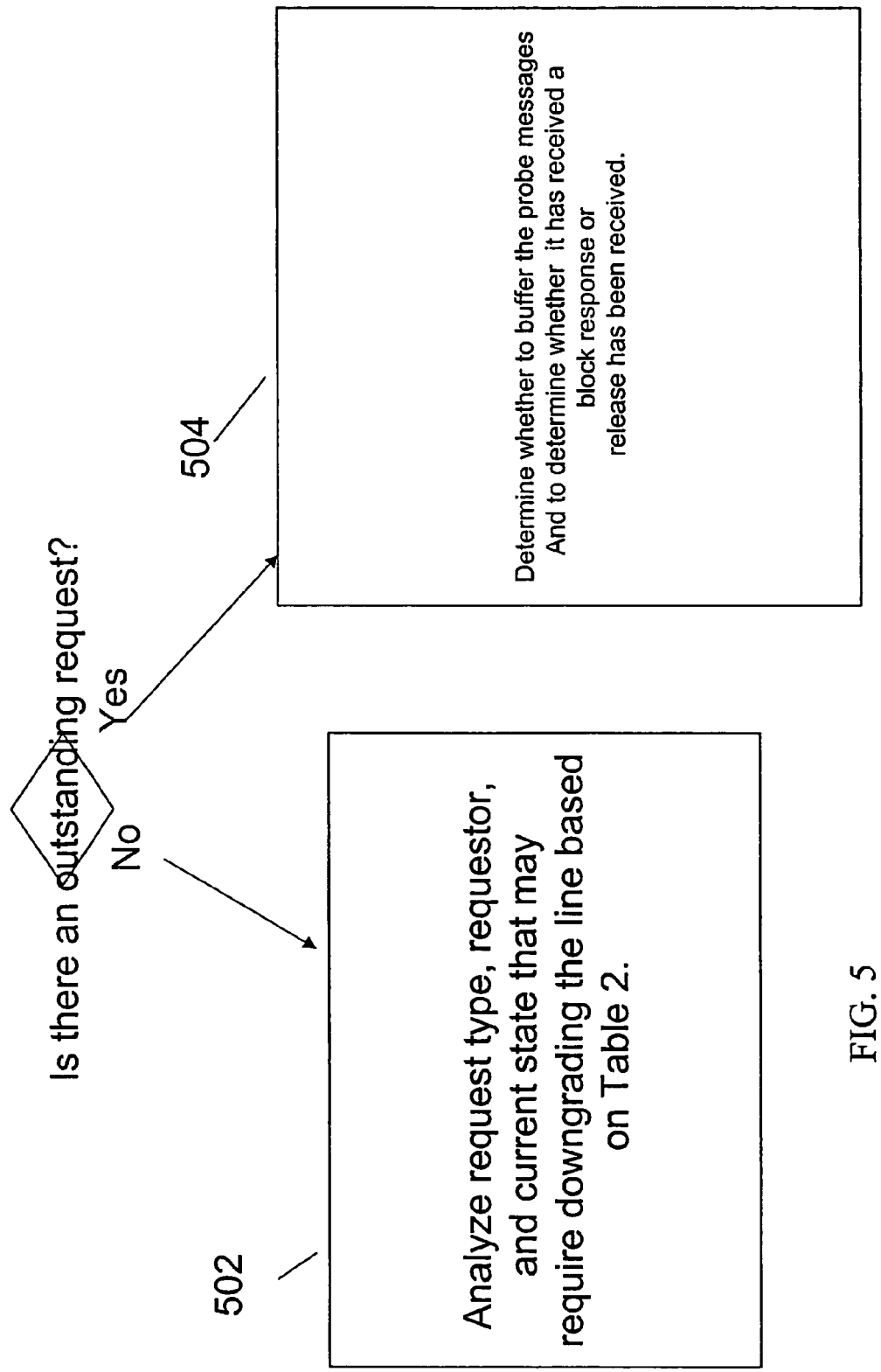
FIG. 5 depicts a peer node algorithm processing of probe messages as utilized by one embodiment.

The peer node algorithm describes probe messages are processed under various cache and MAF states. At the top-level, the algorithm depends on whether this node has an outstanding request or not, see FIG. 5.

When there is no outstanding request, block 502 indicates the probe is processed by the caching agent, potentially extracting the line as a probe response. A Read, ReadShared, ReadMod, or Fetch can cause the data block to be extracted and sent to the requestor. The block is sent in the correct state depending on the incoming request and the current state of the line. There are some combinations of request type, requestor, and current state that require downgrading the line in the network from M→S or M→I. In these cases, a writeback is sent to the home node. If the line is forwarded to the requestor, then the probe response is either a FwdAck (if there is no writeback to the home node), or a VicAck (if there is a writeback to the home node). In the VicAck case, the actual data is sent with a Victim message on the response channel.

The following table shows the state transitions that the owner makes on an incoming probe.

TABLE 2

| Probe Type | Cache State | Cache Next State | Send To Req | Send to Home | Description |
|---|---|---|---|---|---|
| ReadProbe | M | I | BlkMod | FwdAck | Migratory data mode |
| Read Probe | M | S | BlkForw | VicAck, Victim | Sharing mode |

TABLE 2-continued

| Probe Type | Cache State | Cache Next State | Send To Req | Send to Home | Description |
|---|---|---|---|---|---|
| ReadProbe | E | S | BlkForw | FwdAck | |
| ReadProbe | F | S | BlkForw | FwdAck | |
| ReadProbe | S | S | — | SharedAck | |
| ReadProbe | I | I | — | InvalAck | |
| ReadSharedProbe | M | S | BlkForw | VicAck, Victim | |
| ReadSharedProbe | E | S | BlkForw | FwdAck | |
| ReadSharedProbe | F | S | BlkForw | FwdAck | |
| ReadSharedProbe | S | S | — | SharedAck | |
| ReadSharedProbe | I | I | — | InvalAck | |
| ReadModProbe | M | I | BlkMod | FwdAck | |
| ReadModProbe | E | I | BlkExcl | FwdAck | |
| ReadModProbe | F | I | — | InvalAck | F state data not forwarded for memory consistency reasons |
| ReadModProbe | S | I | — | InvalAck | |
| ReadModProbe | I | I | — | InvalAck | |
| InvaltoDirtyProbe | M | I | InvaltoDirtyResp | VicAck + Victim | |
| InvaltoDirtyProbe | E | I | — | InvalAck | |
| InvaltoDirtyProbe | F | I | — | InvalAck | |
| InvaltoDirtyProbe | S | I | — | InvalAck | |
| InvaltoDirtyProbe | I | I | — | InvalAck | |
| ShardtoDirtyProbe | M | I | — | InvalAck | Issuer would have been invalidated at this point and will fail |
| ShardtoDirtyProbe | E | I | — | InvalAck | Issuer would have been invalidated at this point and will fail |
| ShardtoDirtyProbe | F | I | — | InvalAck | |
| ShardtoDirtyProbe | S | I | — | InvalAck | |
| ShardtoDirtyProbe | I | I | — | InvalAck | |
| FetchProbe | M | M | Blkinval | FwdAck | |
| FetchProbe | E | E | Blkinval | FwdAck | |
| FetchProbe | F | F | BlkInval | FwdAck | |
| FetchProbe | S | S | — | SharedAck | |
| FetchProbe | I | I | — | InvalAck | |

When this node has an outstanding request, processing probes is different as indicated by block 504. In one embodiment, there are no implicit forwards, and under some cases the probes are buffered.

When the outstanding request has not yet received a block response or release, the probe is processed and a CnfltAck probe response is sent. If the probe is for a request for ownership (ReadMod,SharedtoDirty,InvaltoDirty), any shared copies of the line must be invalidated. If a conflicting probe is seen, then the peer node should record state such that it will later generate a DataAckCnflt (when it receives the block response and release).

If the outstanding request has received a block response (or a SharedtoDirtyProb or InvaltoDirtyResp) and it has received a Rel/RelCnflt message, then any incoming conflicting probe is buffered. The peer node can receive a fixed number of incoming conflicting probes based on system size and the number of outstanding requests per node, which limits the amount of buffering required.

In one embodiment, the following ordering rules are utilized for keeping track of cache to cache transfers and victims:

As soon as a request receives a FwdAck, that request should be ordered in front of all subsequent requests to the same address. If the FwdAck message does not carry the address, the home node must guarantee that it is ordered in front of requests to all addresses (the Req2Home message is not guaranteed to arrive before the FwdAck). The FwdAck blocks progress on subsequent requests until it has received all of its other probe responses and Req2Home message, and it has sent out a Rel* to the requester.

Whenever a VicMark is received, the VicMark should become ordered in front of all subsequent requests to the same address. The VicMark blocks progress on subsequent requests until it has received an indication from the memory controller that the Victim data message has been received and written out, and a Rel has been sent to the victimizer.

In one embodiment, the home node can apply a few rules to detect and handle conflict cases as follows:

If a VicMark has been received and the associated Victim has been written out to memory, then we can send a Rel to the victimizer and deallocate the VicMark Tracker entry (this allows subsequent requests to the same address to be processed).

If a request with a FwdAck probe response has received all of its probe responses and Req2Home message, then we can send a Rel to the requestor if the conflict list is null, and a RelCnflt otherwise.

If a request with a VicAck probe response has received all of its probe responses and Req2Home message, and the associated Victim message has been written out to memory, then we can send a Rel to the requestor if the conflict list is null, or a RelCnflt if otherwise.

If a request has received its Req2Home message and all of its probe responses, and there was no implicit forward (FwdAck or VicAck probe response), then supply the block from memory (or InvaltoDirtyResp/SharedtoDirtyProb) and send a Rel to the requester if the conflict list is null, or a RelCnflt if otherwise.

On arrival of a plain DataAck and the conflict list is null, the home sends a Rel to the owner, which retires its MAF entry.

On arrival of a DataAckCnflt or a DataAck but the conflict list is not null, we perform an associative address search of the Tracker. For any request to a matching address that has received his probe response from the current owner, we clear the reference to the owner in the requestor's conflict list (as described in Section 6.2). The home node then must fairly pick one of the true conflictors to be the next owner. The home node then sends a RelFwd* message to the owner, which will cause the owner to send the block to the selected conflictor. The precise RelFwd* message that is sent depends on the request type (Section 4.2 has information on this). It is also possible that the search of the Tracker yields no true conflictors, in which case the home node sends a Rel to the owner.

The arrival of a DataAckVic or DataAckCnfltVic causes the home node to wait for the in-flight Victim from the previous owner to be written out to memory. It then follows the normal DataAckCnflt or DataAckCnfltVic flow.

On arrival of a Failure message, the home node should read the block from memory and deliver a BlkExcl and Rel to the requestor.

Figure 6:
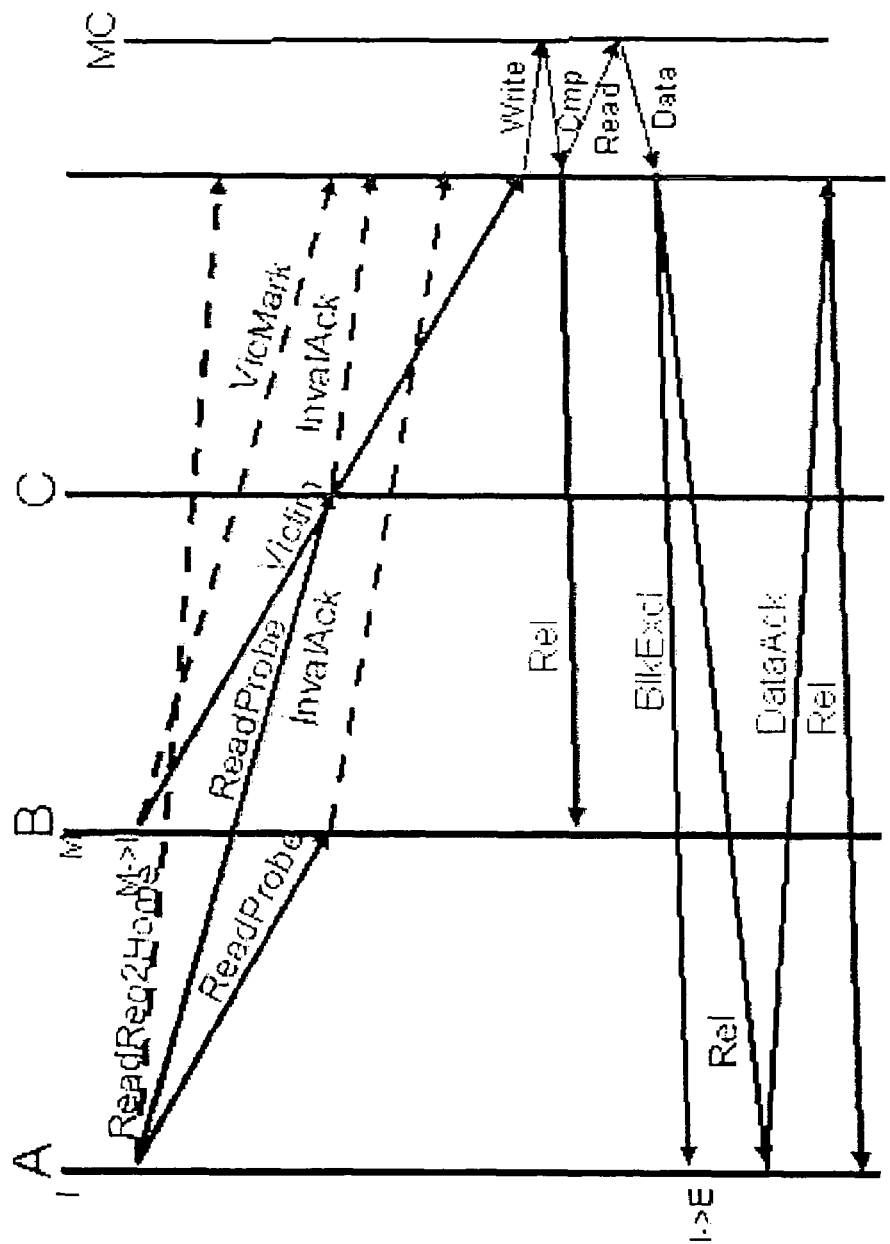
FIG. 6 depicts processing request messages between two nodes as utilized by one embodiment.

FIG. 6 depicts processing request messages between two nodes as utilized by one embodiment. For example, it shows a victim and a request in flight from two nodes. Even though the Req2Home is received first by the home node, it is not ordered until all probe responses arrive as well. A victim is sent by B just before it is probed by A, so H sees the VicMark before the InvalAck following it. By applying the following, if there is a line eviction (M→I) at a node, the VicMark for this line is guaranteed to arrive at the home node before any subsequent request receives all of its probe responses and Req2Home message at the home node."

Similar to the FwdAck invariant, this invariant is used to make sure that a request will always return the latest copy of line, specifically during eviction scenarios.

The VicMark is queued up at the head of the conflict chain. However, it must wait for the Victim data to arrive before writing it to memory, retiring, and returning a Rel to B, which also retires the MAF entry. Completing the Victim also allows the home node to process the Req2Home, which has already received all its probe responses. Seeing no conflicts, the home sends BlkExcl and Rel. A fills the data and sees there are no conflicts and sends a plain DataAck to H. H then retires and sends a Rel to A, which then retires.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A system having a messaging protocol for a plurality of caching agents and a plurality of home agents each guards a piece of coherent memory coupled via a network fabric, the system comprising:

an interface circuit supports the plurality of caching agents supports modified, exclusive, shared, invalid and forward (MESIF) cache states and a home agent determining a winner of a conflict corresponding to a conflict message received by the home agent for an address among at least two of the plurality of caching agents and the home agent requests the data from a requester to be sent to the winner of the conflict responsive to a release forward message from the home agent to the requester and causes the requester to send a latest copy of the data to the winner of the conflict and to downgrade and maintain the latest copy of the data until a final release message is received, and causes a victim message to be sent to the home agent and a block victim message to be sent to the winner, the release forward message is selected from a plurality of release messages based on a request type; and the interface circuit to allow at least one of the plurality of home agents to sink all request, acknowledgement, and response messages without a dependency on a forward progress of any other message.

2. The system of claim 1 wherein the network fabric adheres to a layered protocol scheme.

3. The system of claim 2 wherein the layered protocol scheme comprises at least one of a link layer, a protocol layer, a routing layer, a transport layer, and a physical layer.

4. A system comprising:

a dynamic random access memory (DRAM) coupled to a processor configuration of at least one processor supporting network fabric links to a network fabric of a plurality of caching agents;

the plurality of caching agents supports modified, exclusive, shared, invalid and forward (MESIF) cache states, wherein one of the plurality of caching agents sends a probe message on a probe channel and a request message on a second channel, and wherein one of the plurality of caching agents is designated as a home agents which determines a winner of a conflict corresponding to a conflict message received by the home agent for an address among at least two of the plurality of caching agents;

the home agent requests the data from a requester to be sent to the winner of the conflict responsive to a release forward message from the home agent to the requester to cause the requester to send a latest copy of the data to the winner and to downgrade and maintain the latest copy of the data until a final release message is received, and causes a victim message to be sent to the home agent and a block victim message to be sent to the winner, the release forward message is selected from a plurality of release messages based on a request type; and a miss address file entry to be maintained for each miss request.

5. The system of claim 4 wherein the network fabric links communicate via an interface that adheres to a layered protocol scheme.

6. The system of claim 4 wherein at least one processor has multiple cores with either split or shared caches.

7. The system of claim 4 wherein the network fabric links adhere to a layered protocol scheme comprises at least-one of a link layer, a protocol layer, a routing layer, a transport layer, and a physical layer.

8. The system of claim 4 wherein a Miss Address File (MAF) controller transmits the miss requests into the network.

9. The system of claim 8 wherein the MAF controller transmits the miss requests into the network on an individual basis.

10. A system comprising:
a dynamic random access memory (DRAM) coupled to a processor configuration of at least one processor supporting network fabric links to a network fabric of a plurality of caching agents;
the plurality of caching agents supports modified, exclusive, shared, invalid and forward (MESIF) cache states, wherein one of the plurality of caching agents sends a probe message on a probe channel and a request message on a second channel, and wherein one of the plurality of caching agents is designated as a home agents which determines a winner of a conflict corresponding to a conflict message received by the home agent for an address among at least two of the plurality of caching agents, and the home agent requests the data from a requester to be sent to the winner of the conflict responsive to a release forward message from the home agent to the requester to cause the requester to send a latest copy of the data to the winner and to downgrade and maintain the latest copy of the data until a final release message is received, and causes a victim message to be sent to the home agent and a block victim message to be sent to the winner, the release forward message is selected from a plurality of release messages based on a request type; and
a home virtual channel is strictly ordered per address from each of the plurality of caching agents to the home agent.

11. The system of claim 10 wherein the network fabric links communicate via an interface that adheres to a layered protocol scheme.

12. The system of claim 10 wherein at least one processor has multiple cores with either split or shared caches.

13. The system of claim 10 wherein the network fabric links adhere to a layered protocol scheme comprises at least one of a link layer, a protocol layer, a routing layer, a transport layer, and a physical layer.

\* \* \* \* \*